F. A. DICKINSON.
PACKING RING OR GASKET.
APPLICATION FILED OCT. 5, 1911.

1,017,855.

Patented Feb. 20, 1912.

WITNESSES:

INVENTOR
Frank A. Dickinson,
BY
Joshua R. H. Potts.
Attorney

UNITED STATES PATENT OFFICE.

FRANK A. DICKINSON, OF PHILADELPHIA, PENNSYLVANIA.

PACKING-RING OR GASKET.

1,017,855. Specification of Letters Patent. Patented Feb. 20, 1912.

Application filed October 5, 1911. Serial No. 652,966.

*To all whom it may concern:*

Be it known that I, FRANK A. DICKINSON, a citizen of the United States, residing at Philadelphia, in the county of Philadelphia and State of Pennsylvania, have invented certain new and useful Improvements in Packing-Rings or Gaskets, of which the following is a specification.

My invention relates to improvements in packing rings or gaskets, the object of the invention being to provide an improved device of this character which may be utilized in practically all places where tight packing rings are desired, and which will effectually resist the passage of steam or other fluid, and lubricate as well.

With this and other objects in view, the invention consists in certain novel features of construction and combinations and arrangements of parts, as will be more fully hereinafter described and pointed out in the claims.

Figure 1:
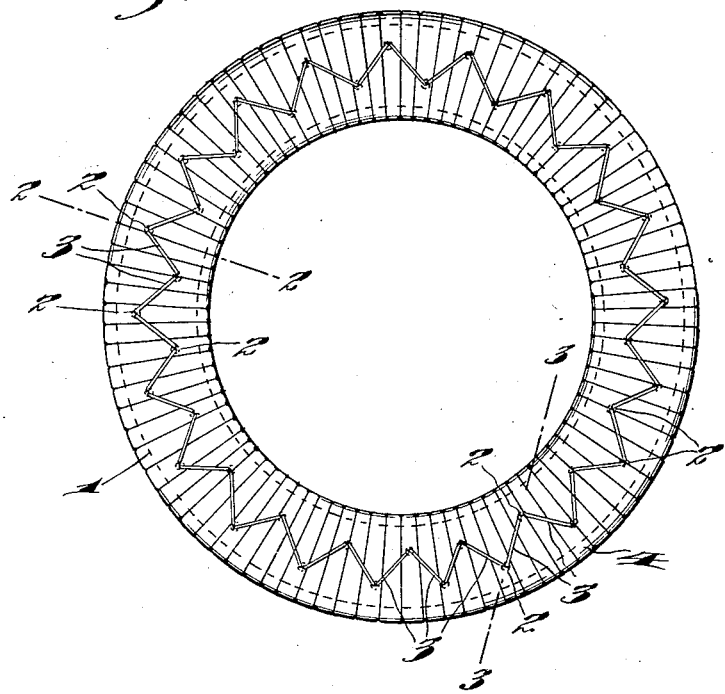
Figure 2:
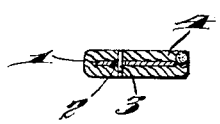
Figure 3:
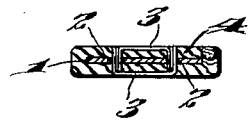

In the accompanying drawings: Figure 1, is a plan view of my improved packing ring or gasket. Fig. 2, is a view in section on the line 2—2 of Fig. 1, and Fig. 3, is a view in section on the line 3—3 of Fig. 1.

In constructing my improved packing ring or gasket, I employ a thin metal ring 1, which is preferably of copper or some relatively soft metal, and is perforated as shown at 2 for the reception of binding wires or threads 3, which serve to securely hold a winding 4 of asbestos graphite treated cord, wound thereon. In other words, upon the said ring 1, the cord 4 is wound, and is secured to the ring by means of the binding wires or threads 3. The ring is then flattened and treated with graphite, so that it becomes a lubricating packing ring, as well as one capable of forming a tight joint. The binding wires or threads 3 are crossed through each opening and passed backwardly and forwardly as shown most clearly in Fig. 1, so as to effectually bind the cord 4 on a metal ring.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A packing ring or gasket comprising a metal ring, and a cord wound on said ring and secured to said metal ring, substantially as described.

2. A packing ring or gasket comprising a flat metal ring, and a cord wound around and entirely inclosing said ring, and said cord secured to said metal ring and flattened and treated with graphite, substantially as described.

3. A packing ring or gasket comprising a metal ring, a cord wound on said ring, said metal ring perforated, and a flexible binder sewed backwardly and forwardly through said perforations and through said cord, binding the cord on the ring, substantially as described.

4. A packing ring or gasket comprising a flat metal ring, a cord wound around and entirely inclosing said ring, and said cord flattened and treated with graphite, said metal ring perforated, and a flexible binder sewed backwardly and forwardly through said perforations and through said cord, binding the cord on the ring, substantially as described.

In testimony whereof I have signed my name to this specification in the presence of two subscribing witnesses.

FRANK A. DICKINSON.

Witnesses:
R. H. KRENKEL,
CHAS. E. POTTS.

Copies of this patent may be obtained for five cents each, by addressing the "Commissioner of Patents, Washington, D. C."